United States Patent [19]

Crider et al.

[11] Patent Number: 5,193,483

[45] Date of Patent: Mar. 16, 1993

[54] SECONDARY SENSING SYSTEM FOR CONTACTOR CONTROL SYSTEM

[76] Inventors: Grant W. Crider, Rte. 1, Box 17, Bremen, Ala. 35033; Anthony L. Ellard, Rte. 8, Box 170, Cullman, Ala. 35055

[21] Appl. No.: 951,774

[22] Filed: Sep. 28, 1992

[51] Int. Cl.$^5$ ............................................. A01K 31/00
[52] U.S. Cl. ......................................... 119/16; 119/21
[58] Field of Search .................. 119/16, 19, 15, 21; 236/49.3, 44 C; 237/2 A; 52/1

[56] References Cited

U.S. PATENT DOCUMENTS

| | | | |
|---|---|---|---|
| 3,669,350 | 6/1972 | White | 236/49.3 |
| 3,743,009 | 7/1973 | Dagerford | 236/44 C X |
| 3,915,377 | 10/1975 | Sutton, Jr. | 119/21 X |
| 4,113,175 | 9/1978 | Sutton, Jr. | 236/49.3 X |
| 4,281,789 | 8/1981 | Quinlisk | 236/49.3 X |
| 4,602,739 | 7/1986 | Sutton, Jr. | 236/49.3 X |
| 4,700,887 | 10/1987 | Timmons | 236/49.3 |
| 4,986,469 | 1/1991 | Sutton, Jr. | 236/49.3 |
| 5,031,574 | 7/1991 | McDowell | 119/21 |

Primary Examiner—Robert P. Swiatek
Assistant Examiner—Thomas Price
Attorney, Agent, or Firm—Jennings, Carter, Thompson & Veal

[57] ABSTRACT

In an animal confinement structure having a contactor control device which controls a temperature control apparatus utilized for applying heating or cooling to the structure responsive to the ambient temperature sensed, a secondary system employed for control of temperature outside a preselected temperature regime, upon the failure of the contactor control device or loss of power. A remote temperature sensor is operatively connected to a pair of electronic thermostatic circuits for independently sensing the ambient temperature for comparison to the preselected range, and connected to a power supply utilized for energizing a relay resulting in the temperature control apparatus by independently actuated responsive to the sensed ambient temperature. The secondary system may be selectively used to control a temperature control apparatus which provides either heating or cooling.

16 Claims, 2 Drawing Sheets ic thermostat circuits $21a$ and $22b$ act like switches in the power supply circuit $22$ and prevent power from reaching the coil $23$ until the selected threshold setting has been reached.

SECONDARY SENSING SYSTEM FOR CONTACTOR CONTROL SYSTEM

FIELD OF THE INVENTION

The present invention relates to animal husbandry and more specifically to electronic circuitry for maintaining the internal ambient temperature in an animal confinement facility within some preselected range. In even greater particularity the present invention relates to electronic circuitry used in conjunction with a temperature control apparatus which is mutually controlled by a contactor control device in a power supply circuit and circuitry which can be operatively connected to the contactor control system. This secondary system will be employed for control of the temperature control apparatus outside a preselected temperature regime, upon the failure of said contactor control device or loss of power.

BACKGROUND OF THE INVENTION

Modern animal confinement facilities have to include several units which all cooperate together within the structure itself for maintaining the internal ambient temperature within some preselected range. Typically, the systems utilized for controlling the temperature within an animal confinement structure include; fans, heaters, controllers, curtain operators, alarms, curtain drops, evaporative cooling systems and contactor control systems. The contactor control devices utilized in these systems must insure adequate selective control as to whether heating or cooling will be applied to the animal confinement structure responsive to the internal ambient temperature being sensed in order to maintain this temperature within the preselected range. The contactor control systems which are utilized have not been able to adequately control for small fluctuations in temperatures. Fluctuations of more than 1 degree from the ideal can result in disaster with some forms of livestock, in that these small, temperature fluctuations have been associated with some of the livestock becoming sick, or in some cases, even dying. While most systems used in typical temperature control systems can usually prevent death, their inability to provide adequate control within some preselected range does very little in preventing stress or sickness to various forms of livestock. These systems do not provide for the adequate control to properly actuate the temperature control apparatus when the sensed ambient temperature is outside the preselected range.

SUMMARY OF THE INVENTION

It is the principal object of the present invention to provide an improved apparatus for controlling the internal ambient temperature beyond the control means provided by stated contactor control device so that it is being maintained within some preselected range of temperature. This improved apparatus utilizes circuitry which allows for initially sensing the ambient temperature independently of the contactor control device in order to compare it to the preselected range, selection as to whether the apparatus utilized for controlling a device which is designed to apply heating or cooling to the structure in direct response to the sensed internal ambient temperature; and finally for actuating the device in response to this sensed temperature.

BRIEF DESCRIPTION OF THE DRAWINGS

Apparatus embodying features of my invention are depicted in the accompanying drawings which form a portion of this disclosure and wherein.

DESCRIPTION OF A PREFERRED EMBODIMENT

Figure 1:
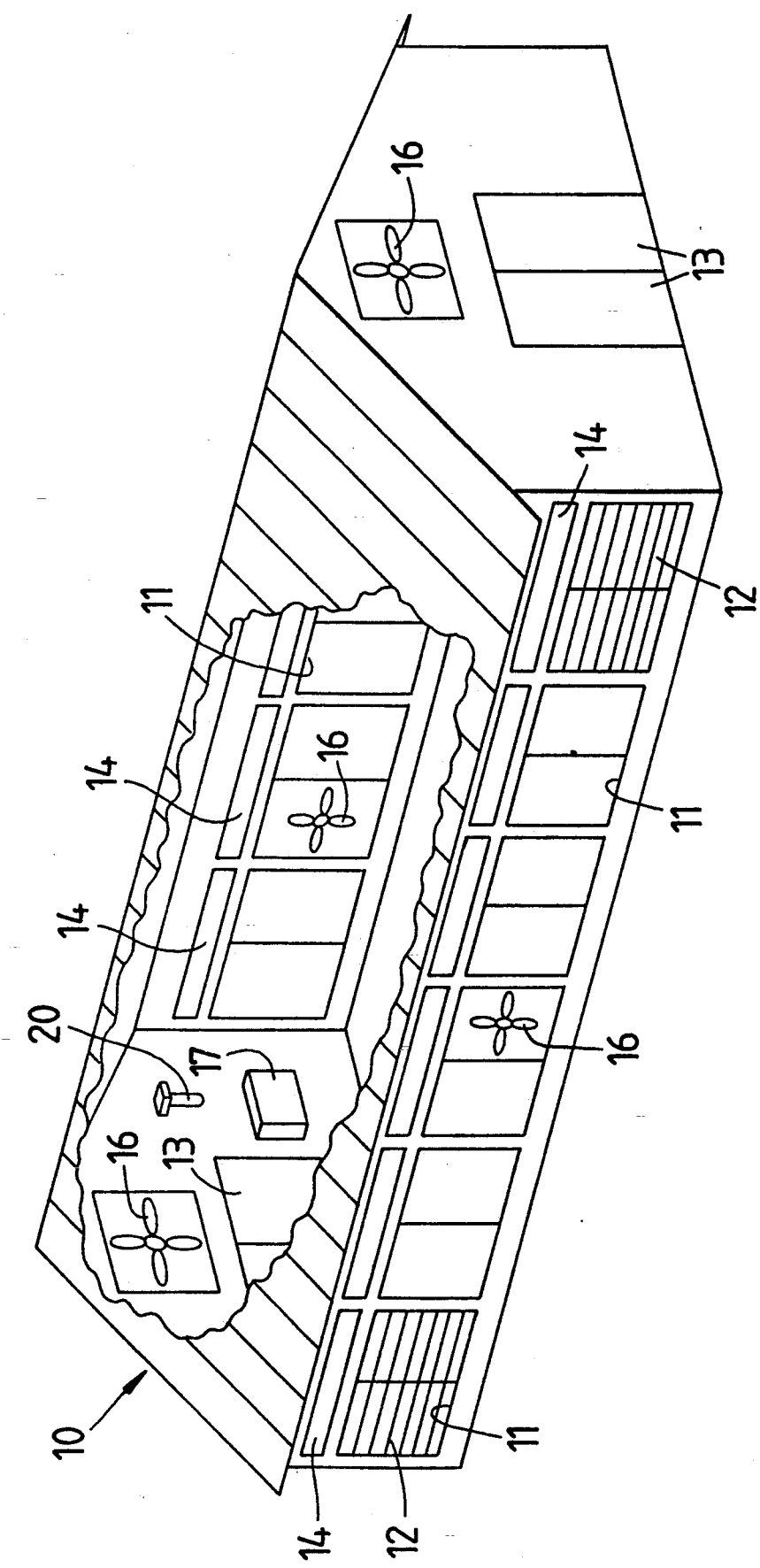
FIG. 1 is a schematic of the present invention operatively connected to a temperature control apparatus.

Referring to the drawings for a clearer understanding of the invention, it will be noted in FIG. 1, that the confinement house 10 is equipped with a plurality of windows 11, curtains 12, doors 13, vents 14 and fans 16. The house 10 also includes heaters, sprayers and other devices, hereinafter commonly called temperature control apparatus (TCA) which are not illustrated, yet which may all be controlled from a single contactor control panel 17. The contactor control panel includes a plurality of circuits in a normally open or normally closed configuration, each circuit dedicated to a particular TCA. To insure the health of the animals, the present invention permits selected ones of these TCA's to be connected to a separate secondary sensing system, which will actuate that particular TCA in response to a sensed condition.

Figure 2:
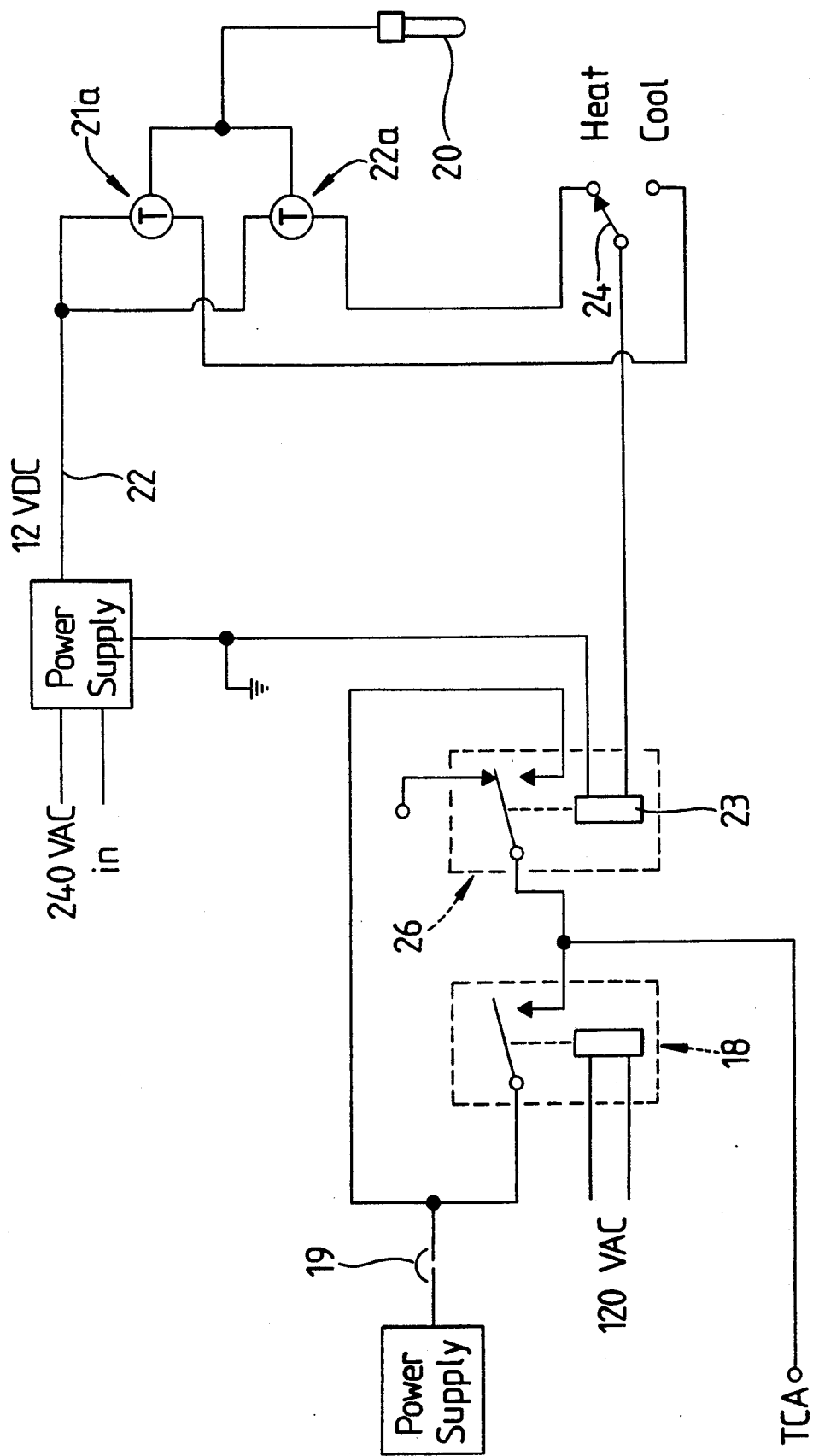
FIG. 2 is a schematic of the present invention.

As may be seen in FIG. 2, the major component in the contactor control system is a forty amp contactor relay 18 which is a normally open relay controlled by a primary control device such as a thermostat or electronic controller. The relay 18 is operatively connected in the circuit between a circuit breaker 19 and the TCA and assists in maintaining the temperature at the selected level.

Also connected between selected ones of the TCA's and its circuit breaker is a secondary sensing system, which provides a failsafe or backup for the contactor control system. The secondary sensing system operates independently of the primary control device and serves to prevent disastrous results when the primary control system and the contactor control panel do not work properly. That is to say, the secondary sensing system senses gross deviations from the ideal temperature and actuates TCA to ameliorate the temperature extreme. In as much as the temperature is normally controlled to within $\pm 1°$ of a selected ideal temperature, this gross deviation may be $\pm 10°$ for example, and would only be reached if something untoward occurred in the primary system.

To this end I use a temperature sensor 20 which is independent of the primary control system but which is associated with one of the TCA and located appropriately to sense the ambient temperature within the house. This temperature sensor is operatively connected to two parallel electronic thermostatic circuits $21a$ and $22b$ and which act in effect like switches in a power supply circuit 22 for the secondary sensing system. Normally, both of these sensors create an open circuit condition in a 12 volt DC circuit which includes a coil 23 and a "heat" or "cool" selector switch 24. Selected switch 24 is merely means for connecting either electronic thermostat circuit $21a$ or $22b$ with the coil 23 and the power supply. These circuits $21a$ or $22b$, which are commonly available, have a manually actuable control knob (not shown) to enable the operator to set a rotating slide switch to a selected threshold setting. Thus these electronic thermostat circuits 21a and 22a allow the operator to set an upper or lower temperature for the acceptable temperature range, thereby establishing the gross deviation permitted before the secondary sensing system actuates a particular TCA.

For example, if the primary control system were maintaining a chicken house at 75° F. and one secondary sensing circuit was connected to actuate a cooling fan, the electronic thermostatic circuit might be set at 82° F.; another device, such as a heater might be connected to another similar secondary sensing circuit which includes an electronic thermostatic circuit set at 60° F. The secondary sensing circuit for the fan would have selector switch 24 set in the cool position while the secondary sensing circuit for the heater would have its selector switch 24 set to heat. Both circuits might be connected to provide backup to the same contactor control system.

The actual backup is provided through a secondary relay 26 connected in parallel to the contactor relay 18 such that when the selected electronic thermostat circuit 21a or 22a senses an abnormal temperature coil 23 is actuated to move the common arm of the relay 26 to the normally open terminal to actuate the appropriate TCA.

It will be appreciated that the contactor control system is actually a pre-wired single, double, or triple pole contactor system which may control up to twelve circuits, thus a built in backup for each or any circuit is envisioned within the scope of the invention. In the event of a power failure to the contactor panel the secondary sensor circuits for each TCA would be actuated, by the loss of power rather than temperature deviation, that is to say the normally closed connection would open, and assuming that the confinement house had an energy power generator or the like all TCA's connected to the secondary sensing system and alarms would be actuated.

From the foregoing it may be seen that I have devised a system which conveniently and independently actuates each TCA responsive to an unexpected event, greatly reducing the likelihood of a disaster.

While we have shown our invention in one form, it will be obvious to those skilled in the art that it is not so limited but is susceptible of various changes and modifications without departing from the spirit thereof.

What I claim is:

1. In a livestock confinement structure wherein the internal ambient temperature is controlled within a preselected range of temperature to prevent deleterious effects on the livestock by the use of temperature control apparatus including fans, heaters, drop curtains, cooling systems and electronic control devices wherein said temperature control apparatus are mutually controlled by a contactor control device in a power supply circuit thereto wherein the improvement comprises:
   (a) means for independently sensing the ambient temperature for comparison to said preselected range;
   (b) means for selecting whether said temperature control apparatus will apply heating or cooling to said structure responsive to a sensed ambient temperature; and
   (c) means for independently actuating said temperature control apparatus responsive to said sensing means.

2. The improvement as recited in claim 1 further comprising a plurality of thermostats operatively connected to said means for independently sensing the ambient temperature for comparison to said preselected range.

3. The improvement as recited in claim 2 wherein said sensing means comprises a remote temperature sensor.

4. The improvement as recited in claim 2 wherein said plurality of thermostats are electronic thermostatic circuits.

5. The improvement as recited in claim 4 wherein said electronic thermostatic circuits activate said independent actuating means.

6. The improvement as recited in claim 5 wherein a selection means operatively connects a selected one of said plurality of thermostat to said means for sensing.

7. The improvement as recited in claim 5 wherein said selection means is a switch which enables one of said electronic thermostatic circuits.

8. The improvement as recited in claim 1 further comprises an independent adjustment means for independently adjusting said preselected range of temperature.

9. The improvement as recited in claim 8 further comprises a plurality of slide activating rotatable elements which are operatively connected to said independent sensing means.

10. The improvement as recited in claim 1 wherein said actuating means is a relay which is operatively connected to a power supply circuit which energizes said temperature control apparatus.

11. Method for controlling the internal ambient temperature in a livestock confinement structure within a preselected range of temperature by a temperature control apparatus including fans, heaters, drop curtains, cooling systems and electronic control devices wherein said temperature control apparatus is mutually controlled by a contactor control device in a power supply circuit thereto wherein the improvement comprises the steps of:
   (a) independently sensing the internal ambient temperature in order to compare it to a preselected range of temperature;
   (b) selecting whether the temperature control apparatus will apply heating or cooling to the structure in response to the sensed internal ambient temperature; and
   (c) independently actuating the temperature control apparatus in response to the following events;
      (i) temperatures which are outside the preselected range; and
      (ii) loss of power.

12. The improved method as recited in claim 11 wherein said step for independently sensing the internal ambient temperature is accomplished with a remote sensor which is operatively connected to a plurality of thermostats.

13. The improved method as recited in claim 12 wherein the plurality of thermostats are electronic thermostatic circuits which compare the internal ambient temperature being sensed with said remote sensor to the preselected range of temperature.

14. The improved method as recited in claim 13 further comprises the step of independently adjusting the preselected range of temperature from each temperature control apparatus.

15. The improved method as recited in claim 13 wherein the step of selecting whether the temperature control apparatus will apply heating or cooling to said structure enabling one of the plurality of electronic thermostatic circuits, includes connecting one of the plurality of electronic thermostatic circuits to said remote sensor.

16. The improved method as recited in claim 11 wherein said actuating step utilizes a relay which is operatively connected to its own power supply.

* * * * *